United States Patent
Roskind et al.

(10) Patent No.: US 10,007,726 B2
(45) Date of Patent: Jun. 26, 2018

(54) RESOLVING A HOST EXPRESSION TO AN INTERNET PROTOCOL ADDRESS

(71) Applicant: Google Inc., Mountain View, CA (US)

(72) Inventors: James Anthony Roskind, Redwood City, CA (US); Christopher Bentzel, Quincy, MA (US)

(73) Assignee: GOOGLE LLC, Mountain View, CA (US)

( * ) Notice: Subject to any disclaimer, the term of this patent is extended or adjusted under 35 U.S.C. 154(b) by 280 days.

(21) Appl. No.: 14/042,375

(22) Filed: Sep. 30, 2013

(65) Prior Publication Data

US 2014/0281032 A1    Sep. 18, 2014

Related U.S. Application Data

(60) Provisional application No. 61/780,672, filed on Mar. 13, 2013.

(51) Int. Cl.
*H04L 29/12* (2006.01)
*H04L 29/08* (2006.01)
(Continued)

(52) U.S. Cl.
CPC .... *G06F 17/30861* (2013.01); *H04L 61/1511* (2013.01); *H04L 61/6009* (2013.01)

(58) Field of Classification Search
CPC . H04L 61/10; H04L 61/1511; H04L 61/6009; H04L 61/6068; H04L 29/12066;
(Continued)

(56) References Cited

U.S. PATENT DOCUMENTS

| | | | | |
|---|---|---|---|---|
| 7,441,045 | B2 * | 10/2008 | Skene | G06F 9/505 709/201 |
| 2001/0052016 | A1 * | 12/2001 | Skene | G06F 9/505 709/226 |

(Continued)

OTHER PUBLICATIONS

The Chromium Projects, "SPDY Protocol—Draft 2", Mar. 08, 2013 from wayback machine https://web.archive.org/web/20130308023743/http://www.chromium.org/spdy/spdy-protocol/spdy-protocol-draft2.*

(Continued)

*Primary Examiner* — Edward Kim
(74) *Attorney, Agent, or Firm* — McDermott Will & Emery LLP

(57) ABSTRACT

Systems and methods for resolving a request associated with a host expression to an Internet Protocol (IP) address are provided. In some aspects, a request for content from a content server is transmitted from a client computing device. The request is associated with a host expression of the content server. A message including the requested content and an indication of an Internet Protocol (IP) address set of a DNS resolution of the host expression of the content server is received in response to the request. The requested content includes text or an image. The IP address set of the DNS resolution of the host expression of the content server is stored in a local memory of the client computing device. The IP address set is stored for resolution of future requests associated with the host expression of the content server locally at the client computing device.

20 Claims, 5 Drawing Sheets

(51) Int. Cl.
  *H04L 29/06* (2006.01)
  *G06F 17/30* (2006.01)
(58) Field of Classification Search
  CPC ............. H04L 61/1552; H04L 67/2842; H04L 29/12811; H04L 29/12132; G06F 17/30861
  USPC ....... 709/245, 201, 202, 203, 217, 218, 219, 709/220, 221, 225
  See application file for complete search history.

(56) References Cited

U.S. PATENT DOCUMENTS

| | | | |
|---|---|---|---|
| 2006/0239430 A1* | 10/2006 | Gue ........................ | G06Q 30/06 379/201.05 |
| 2009/0177798 A1* | 7/2009 | Bogner ............. | H04L 29/12066 709/245 |
| 2009/0222584 A1* | 9/2009 | Josefsberg ........ | H04L 29/12066 709/245 |
| 2010/0049872 A1* | 2/2010 | Roskind ............ | G06F 17/30902 709/245 |
| 2010/0057936 A1* | 3/2010 | Roskind ............ | H04L 29/12066 709/245 |
| 2010/0131646 A1* | 5/2010 | Drako ............... | H04L 29/12066 709/225 |
| 2011/0137973 A1* | 6/2011 | Wei .................... | H04L 67/1008 709/202 |

OTHER PUBLICATIONS

Anonymous, "SPDY Protocol—Draft 2—The Chromium Projects," Mar. 8, 2013, 17 pages, <https://web.archive.org/web/20130308023743/http://chromium.org/spdy/spdy-protocol/spdy-protocol-draft2>.

Cardellini, et al., "Dynamic load balancing on Web-server systems," IEEE Internet Computing, Jan. 1, 1999, pp. 28-39, <http://ieeexplore.ieee.org/xpls/abs_all.jsp?arnumber=769420>.

* cited by examiner

RESOLVING A HOST EXPRESSION TO AN INTERNET PROTOCOL ADDRESS

CROSS REFERENCE TO RELATED APPLICATIONS

This application claims priority under 35 U.S.C. § 119(e) and the benefit of U.S. Provisional Application No. 61/780,672, filed Mar. 13, 2013, and entitled, "RESOLVING A HOST NAME TO AN INTERNET PROTOCOL ADDRESS," the entire disclosure of which is incorporated herein by reference.

BACKGROUND

The subject technology generally relates to network access technology and, in particular, relates to resolving a host name to an Internet Protocol (IP) address.

When a user of a client computing device accesses a webpage, (e.g., example.com, by entering a uniform resource locator (URL) into a web browser or clicking on a link, etc.), the client computing device is directed to a content server such as example.com by resolving a host name (e.g., "example.com") to an IP address (e.g., "1.2.3.4") using a default domain name service (DNS) lookup server (e.g., a DNS lookup server provided by an Internet Service Provider (ISP)). The IP address can be an IPv4 address or an IPv6 address. The default DNS lookup server may cover a broad range of client computing devices, resulting in suboptimal steering of requests to servers with poor geographic balancing or load balancing. For example, one server may be overloaded while another server for the same content is processing relatively few requests. Alternatively, a request from a client computing device in San Francisco to a server in Seattle may be routed via Atlanta and New York City, rather than directly from San Francisco to Seattle. As the foregoing illustrates, a new approach for resolving a host name to an IP address may be desirable.

SUMMARY

In some aspects, the disclosed subject matter relates to a computer-implemented method for receiving a domain name service (DNS) resolution for a content server. The method includes transmitting, from a client computing device, a request for content from a content server, the request being associated with a host expression of the content server. The method includes receiving, in response to the request, a message including the requested content and an indication of an Internet Protocol (IP) address set of a DNS resolution of the host expression of the content server, where the requested content includes text or an image associated with a display for a webpage, and where the requested content is different from the indication of the IP address set. The method includes storing, in a local memory of the client computing device, the IP address set of the DNS resolution of the host expression of the content server, the IP address set being stored for resolution of future requests associated with the host expression of the content server locally at the client computing device.

In some aspects, the disclosed subject matter relates to a non-transitory computer-readable medium for receiving a domain name service (DNS) resolution for a content server. The computer-readable medium includes instructions which, when executed by a computer, cause the computer to implement a method. The method includes transmitting, from a client computing device, a request for content from a content server, the request being associated with a host expression of the content server, the content from the content server including text or an image associated with a display for a webpage. The method includes receiving, in response to the request, a message indicating an Internet Protocol (IP) address set of a DNS resolution of the host expression of the content server, the message being provided in conjunction with the requested content. The method includes storing, in a local memory of the client computing device, the IP address set of the DNS resolution of the host expression of the content server, the IP address set being stored for resolution of future requests associated with the host expression of the content server locally at the client computing device.

In some aspects, the disclosed subject matter relates to a system for providing for resolving a request associated with a host expression to an Internet Protocol (IP) address. The system includes one or more processors. The system includes a memory including instructions which, when executed by the one or more processors, cause the one or more processors to implement a method. The method includes storing, at a content server, a first IP address set of a domain name service (DNS) resolution of a host expression of the content server. The method includes receiving, at the content server, a request for content of the content server, the request being generated on a client computing device, the request being associated with a DNS resolution corresponding to a second IP address, the content of the content server including text or an image associated with a display for a webpage. The method includes determining that the second IP address is not in the first IP address set. The method includes providing, to the client computing device, in response to the request, a message indicating the first IP address set of the DNS resolution of the host expression of the content server, the message being provided for resolution of future requests associated with the host expression of the content server locally at the client computing device, the message being provided in conjunction with the requested content.

It is understood that other configurations of the subject technology will become readily apparent from the following detailed description, where various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Features of the subject technology are set forth in the appended claims. However, for purpose of explanation, several aspects of the disclosed subject matter are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced without these specific details. In some instances, certain structures and components are shown in block diagram form in order to avoid obscuring the concepts of the subject technology.

As set forth above, in some implementations, a uniform resource locator (URL) is associated with a host name, which is resolved to an Internet Protocol (IP) address (e.g., an IPv4 address or an IPv6 address) via a default domain name services (DNS) lookup server, which may be a recursive caching name server. However, the default DNS server may not optimally steer requests to content servers, resulting in poor geographic balancing or load balancing. In some cases, using a DNS resolution specified by the content server (e.g., a DNS resolution specified by the example.com content server, if content in the example.com domain is being accessed), rather than the default DNS lookup server may result in more optimal geographic balancing or load balancing.

The subject technology provides techniques for resolving a host name to an IP address. In some aspects, a client computing device receives, from a user or an application, a request for content including a URL. For example, a user may enter the URL "https://example.com/foo" into the URL input box of a web browser to request to view a webpage, or the application installed on behalf of the user determines the URL for content to acquire. The client computing device determines a first host name for the URL. For example, the URL "https://example.com/foo" has the host name "example.com." The client computing device determines, based on a lookup in one or more data structures (e.g., a table) stored in a local memory of the client computing device, that the first host name for the URL corresponds to a first DNS resolution with a first IP address set. The one or more data structures include one or more host names. Each host name corresponds to a DNS resolution with an associated IP address set. For example, a table may map host names to DNS resolution IP addresses. The client computing device transmits the request for content according to one of the stored DNS resolution IP addresses. Techniques for creating and maintaining the one or more data structures are described in detail below.

Figure 1:
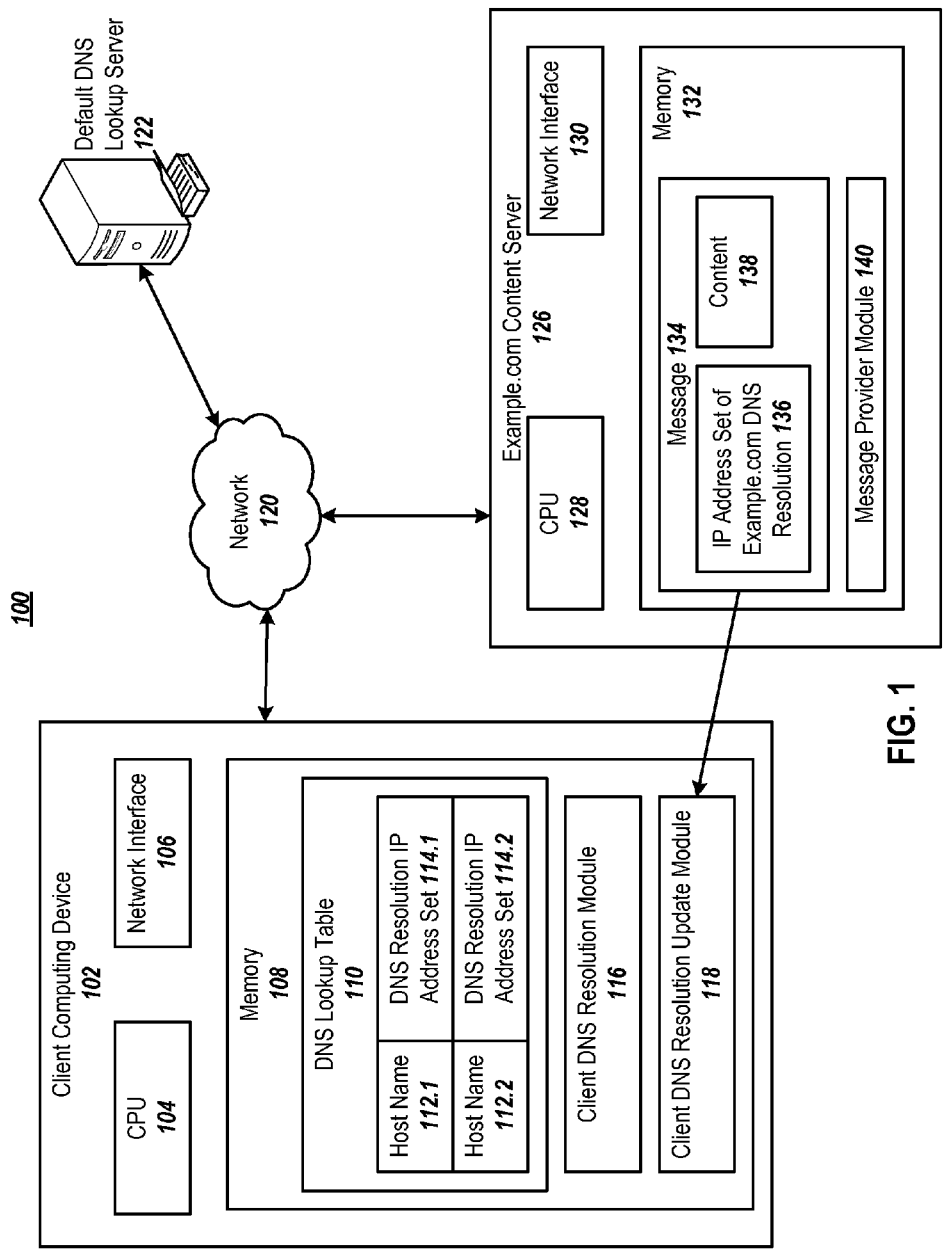
FIG. 1 illustrates an example system for resolving a host name to an Internet Protocol address.

FIG. 1, below, illustrates an example system 100 for resolving a host name to an IP address. The system 100 includes a client computing device 102, a default DNS lookup server 122, and an example.com content server 126 connected to one another via a network 120. The network 120 can correspond to one or more of a wired network, a wireless network, a local area network (LAN), a wide area network (WAN), the Internet, an intranet, a cellular network, a virtual private network (VPN), a telephone network, a satellite network, etc.

As shown, the client computing device 102 includes a central processing unit (CPU) 104, a network interface 106, and a memory 108. The CPU 104 includes one or more processors. The CPU 104 is configured to execute computer instructions that are stored in a computer-readable medium, for example, the memory 108. The network interface 106 is configured to allow the client computing device 102 to transmit and receive data in a network, e.g., network 120. The network interface 106 includes one or more network interface cards (NICs). The memory 108 stores data or instructions. The memory 108 can include dynamic storage (e.g., random access memory) or persistent storage (e.g., a hard drive). In some aspects, persistent storage is used to store data or instructions across multiple sessions and dynamic storage is used for fast access to data or instructions during a session. The memory 108 may be one or more of a cache unit, a storage unit, an internal memory unit, or an external memory unit. As illustrated, the memory 108 includes a DNS lookup table 110, a client DNS resolution module 116, and a client DNS resolution update module 118.

The DNS lookup table 110 stores mappings of host names 112.1-2 to DNS resolution IP address sets 114.1-2. Each host name 112.$k$ is mapped to one DNS resolution IP address set 114.$k$, which may include one or more IP addresses. For example, the host name "example.com" may be mapped to the IP addresses "1.2.3.4," and "1.2.3.5." The host name "xyz-webpage.com" may be mapped to the IP address "5.6.7.8." The client computing device 102 may store DNS resolution IP address sets 114.1-2 for the client computing device 102 and, as a result, may not need to rely on data stored on the default DNS lookup server 122 or route requests based on host names 112.1-2 through the default DNS lookup server 122. The DNS lookup table 110 may store multiple mappings of host names 112.$k$ to multiple DNS resolution IP address sets 114.$k$. For example, the DNS lookup table 110 may include one, two, ten, one hundred, one thousand, or more entries of host names 112.$k$. While the subject technology is illustrated with the DNS lookup table 110 including two host names 112.1-2, the DNS lookup table 110 can include any number of host names 112 and corresponding DNS resolution IP address sets 114. In some aspects, the DNS resolution IP address set 114.$k$ corresponds to IP address(es) of a DNS resolution for an application server (e.g., example.com content server 126).

The DNS lookup table 110 may reside within an application, such as a web browser of the client computing device 102. The DNS lookup table 110 may be prebuilt into the application or updated during an update of the application (e.g., an automatic update or when the user manually downloads a new version of the application). The application can be updated either with a new version of the already stored DNS lookup table 110 or to include the DNS lookup table 110 for the first time. Alternatively, a DNS resolution IP address set (e.g., IP address set 114.1) may be provided to the client computing device 102 from a host associated with the corresponding host name (e.g., host name 112.1) when the client computing device 102 is connected to the host. The DNS resolution IP address set may be provided in conjunction with content (e.g., text or images displayed in a webpage), as described in greater detail below. For example, a hypertext transfer protocol (HTTP) header, a SPDY message or a message in any other protocol for transmitting information over a network may be used to indicate the DNS resolution IP address set.

In some aspects, the DNS lookup table 110 includes support for wildcard hostnames (for example, regular expressions). Additions to the DNS lookup table 110 may be restricted. For example, there may be a restriction to verify that a top level domain (TLD) of a content supplier of a new entry (association of a new host name 112.k to a new DNS resolution IP address set 114.k) matches the host name of any host matching the host expression. As a second example, there may be a restriction that verifies that a cryptographic site authentication certificate, such as a secure socket layer (SSL) host authentication certificate, which is authoritatively presented by the content supplier, such as during formation of an SSL connection to the content supplier, matches the new host name(s) of a new entry.

The TLD may be used, among other uses, for any security purpose. For example, the TLD may be used to allow cookies to be set. In some aspects, a TLD element is used to restrict updating or modifying settings into the DNS lookup table 110. Updating or modifying of settings may also be restricted to updates or modifications where a supplier host name matches a host name 112.k being used as a key in the DNS lookup table.

The memory 108 of the client computing device 102 includes a client DNS resolution module 116. The client DNS resolution module 116 is configured to receive a request for content (e.g., a webpage) that includes a URL. The client DNS resolution module 116 is configured to determine a first host name for the URL. The client DNS resolution module 116 is configured to determine, based on a lookup in the DNS lookup table 110, that the first host name (e.g., host name 112.1) for the URL corresponds to a first DNS resolution at a first IP address set (e.g., DNS resolution IP address set 114.1). The client DNS resolution module 116 is configured to transmit the request for content according to the first DNS resolution (e.g., using an IP address in DNS resolution IP address set 114.1). The client DNS resolution module 116 is configured to receive content from a content server (e.g., example.com content server 126) specified by the first DNS resolution in response to the request for content.

The first DNS resolution can be different from a resolution provided by the default DNS lookup server 122. For example, if the host name is "example.com," the first DNS resolution may correspond to a resolution that could be provided directly to the client by example.com's authoritative DNS resolver. Alternatively, the first DNS resolution can be identical to that which the default DNS lookup server 122 might provide.

The client computing device 102 includes a client DNS resolution update module 118. The client DNS resolution update module 118 is configured to transmit, from the client computing device 102, a request for content from a content server 126. The request is associated with a host name of the content server 126. For example, the request could be for the URL www.example.com. The client DNS resolution update module 118 is configured to receive, in response to the request, a message 134 indicating an IP address set 136 of a DNS resolution of a host expression, such as the host name of the content server 126. The message 134 is provided in conjunction with the requested content 138 (e.g., text or image(s) in a webpage) or via a connection such as SPDY established to acquire web content such as HTTP content. The client DNS resolution update module 118 stores, in a local memory 108 of the client computing device 102 (e.g., in DNS lookup table 110), the IP address set 136 of the DNS resolution of the host name of the content server in conjunction with the host name of the content server. As a result, the client computing device 102 can store a better IP address resolution for the hostname than that available in the default DNS lookup server 122. The IP address set 136 is stored for the resolution of future requests associated with the host name of the content server locally at the client computing device 102 rather than through the default DNS lookup server 122.

The requested content 138 can include content accessed via the network 120, for example text in a webpage or application, image(s) in a webpage or application, video(s) in a web page or application, audio file(s) in a webpage or application, streaming video or audio in a webpage or application, or macro(s) in a webpage or application.

In some aspects, the client DNS resolution update module 118 verifies that the client computing device 102 has a secure connection (e.g., a secure socket layer (SSL), hypertext transfer protocol secure (HTTPS), QUIC, or SPDY connection) with the content server 126. The IP address set 136 may be stored in response to verifying that the client computing device 102 has a secure connection with the content server 126.

In some aspects, the client DNS resolution update module 118 verifies that the content server and the proposed DNS resolutions are both associated with the same domain (e.g., both are associated with example.com). The IP address set 136 may be stored in response to verifying that the content server and the DNS resolutions are both associated with the same domain. As a result, in some implementations, a content server cannot change the DNS resolutions for a domain that is different from that of the content server. For example, a content server for the example.com domain cannot change the DNS resolution for the xyz-webpage.com domain. In some implementations, the content server can change the DNS resolution for additional domains. The content server can change the resolution for any domain for which the content server can prove that the content server possesses authorization to service the domain. For example, www.example.com can be contacted via SSL. Www.example.com uses a certificate that shows that the content server for www.example.com can respond to *.example-.com. The content server for www.example.com can then provide resolutions for www.example.com, images.example.com, and news.example.com. Each of these sites is covered by the server certificate and the SSL certificate was used (authenticated as being owned by the content server) when the connection was made.

The default DNS lookup server 122 is configured to resolve a host name (e.g., example.com) to an IP address (e.g., 1.2.3.4). The default DNS lookup server 122 may be a recursive caching name server provided by an Internet Service Provider (ISP). The default DNS lookup server 122 may be configured to handle multiple DNS lookup requests from multiple different client computing devices, and, as a result, may provide poor geographic balancing or load balancing. As used herein, the phrase "recursive caching name server" encompasses its plain and ordinary meaning. In some aspects, a recursive caching name server may store a mapping of host names to IP addresses in a cache. If the recursive caching name server is unable to find a mapping of a specific host name to an IP address, the recursive caching name server may determine whether such a mapping is stored on another server.

As shown, the content server 126 includes a central processing unit (CPU) 128, a network interface 130, and a memory 132. The CPU 128 includes one or more processors. The CPU 128 is configured to execute computer instructions that are stored in a computer-readable medium, for example, the memory 132. The network interface 130 is configured to allow the content server 126 to transmit and receive data in a network, e.g., network 120. The network interface 130 includes one or more network interface cards (NICs). The memory 132 stores data or instructions. The memory 132 can include dynamic storage (e.g., random access memory) or persistent storage (e.g., a hard drive). In some aspects, persistent storage is used to store data or instructions across multiple sessions and dynamic storage is used for fast access to data or instructions during a session. The memory 132 may be one or more of a cache unit, a storage unit, an internal memory unit, or an external memory unit. As illustrated, the memory 132 includes a message 134 and a message provider module 140.

The message provider module 140 is configured to store, at the content server 126, an IP address set 136 of a DNS resolution of the host name (e.g. "example.com") of the content server. The message provider module 140 is configured to receive, at the content server 126, a request for content 138 of the content server 126. The request for the content 138 can be coupled with a request for a DNS resolution (e.g., through the default DNS lookup server 122). The request for the content 138 is generated on the client computing device 102. The request for the DNS resolution in the request for the content 138 is directed to a second IP address. For example, the second IP address could be an IP address of the default DNS lookup server 122, which is responsible for resolving the request for the DNS resolution. If the second IP address corresponds to the default DNS lookup server 122, the request for the content 138 may be routed from the client computing device 102 to the content server 126 using a DNS lookup at the default DNS lookup server 122.

Alternatively, the second IP address could be an IP address for the content server stored on the client computing device 102 (e.g., in the DNS lookup table 110), which may need to be updated, for example, because the geographic location of the client computing device 102 has changed. The message provider module 140 determines that the second IP address is not in the first IP address set 136. The message provider module 140 provides, to the client computing device 102, in response to the request, the message 134 that indicates the first IP address set 136 for the DNS resolution of the host name of the content server. The message 134 is provided for resolving future requests associated with the host name of the content server locally at the client computing device (e.g., without accessing the default DNS lookup server 122). The message 134 is provided in conjunction with the requested content 138. The requested content 138 may include, for example, HTTP response(s) including text or image(s) in a webpage that was requested at the client computing device 102, for example, by a user entering a URL into an input box of a web browser, or any other HTTP response(s).

As a result of the techniques described above, the DNS lookup table 110 of the client computing device 102 can store DNS resolution(s) 114.1-2 for host name(s) 112.1-2. The DNS resolution(s) 114.1-2 can be obtained via standard DNS resolution techniques, for example, using the default DNS lookup serve 122 or via a content server (e.g., example.com content server 122) in conjunction with content (e.g., via the message 134 that includes the DNS resolution 136 and the content 138).

The message 134 may include a HTTP header indicating the first IP address set 136 for the DNS resolutions of the host name of the content server. In one example, the format of the HTTP header is: "X_SUGGESTEDDNS=1.2.3.4," where "1.2.3.4," is an IP address in the first IP address set 136. As a second example, the format of the HTTP header is: X_SUGGESTDNS=www.example.com:1.2.3.4,net.example.com=1.2.3.5". In that second example, client computing device 102 may condition acceptance of the resolutions, into DNS lookup table 110, on the requirement that the names or host expressions matched the host restrictions seen in an SSL server certificate. For example, the pair would be acceptable if example.com content server 126 was connected to using a server certificate that could authoritatively serve requests to any host of the form *.example.com. In that example, the server certificate for *.example.com was used to establish the connection to content server 126, but other methods of presentation and proof of ownership of such a server certificate can be used in conjunction with the subject technology. In that second example, if only an SSL server certificate covering www.example.com was provided, then computing device 102 may reject at least the proposed resolution of "net.example.com." However, other formats of HTTP headers can be used in conjunction with the subject technology. Alternatively, the message 134 may include a SPDY message that includes the first IP address set 136 for the DNS resolution of the host name of the content server.

According to some examples, the IP address set of example.com DNS resolution 136 includes IP addresses selected based on specific information of the client computing device 102 (e.g., a geographic location of the client computing device 102 for geographic load balancing, whether the client computing device 102 is a mobile phone or a full desktop computer as different content servers may be better equipped to provide data to different client computing device types, etc.).

Figure 2:
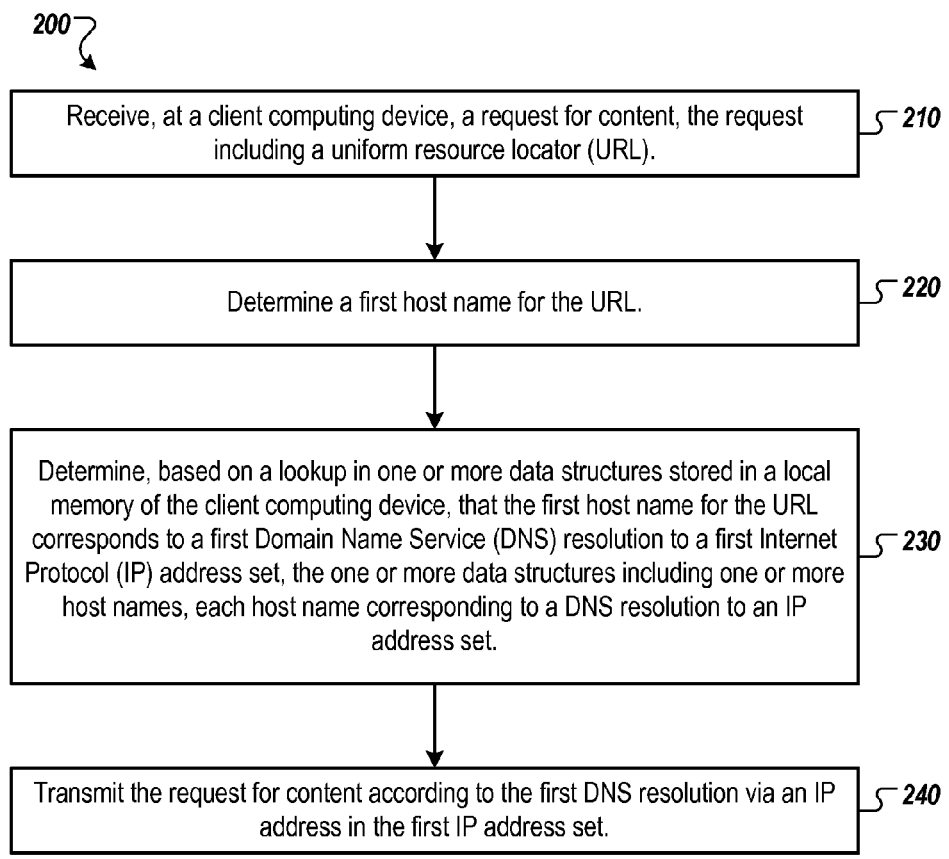
FIG. 2 illustrates an example process by which a request associated with a host name is resolved to an Internet Protocol address at a client computing device.

FIG. 2 illustrates an example process 200 by which a request associated with a host name is resolved to an Internet Protocol address at a client computing device.

The process 200 begins at step 210, where a client computing device (e.g., client computing device 102) receives a request for content. The request includes a uniform resource locator (URL). For example, a user could enter a URL in an input box of a web browser, select a link corresponding to a URL, or open the web browser causing the web browser to display a page corresponding to a default or home URL. Alternatively, information associated with a URL may be accessed via a special purpose application, for example, a social networking or newspaper application executing on a mobile device or tablet computer.

In step 220, the client computing device determines a first host name for the URL. For example, if the URL is "www.example.com/foo," the first host name is "www.example.com."

In step 230, the client computing device determines, based on a lookup in one or more data structures (e.g., DNS lookup table 110) stored in a local memory (e.g., memory 108) of the client computing device, that the first host name for the URL corresponds to a first domain name service (DNS) resolution to a first Internet Protocol (IP) address set. The first IP address set includes one IP address or multiple IP addresses. The one or more data structures include one or more host names, each host name corresponds to a DNS resolution to an IP address set. (E.g., DNS lookup table 110 includes host names 112. Each host name 112.*k* corresponds to a DNS resolution IP address set 114.*k*.) The default DNS resolution (provided by a default DNS resolver, e.g., default DNS lookup server 122) for the host name is potentially distinct from DNS resolution(s) for the host name provided by a content server (e.g., content server 126), which may be stored in the local memory of the client computing device. For example, the default DNS resolution can be provided by a recursive caching name server provided by the Internet Service Provider (ISP) of the client computing device.

In some aspects, the one or more data structures (e.g., DNS lookup table 110) reside within a memory for an application, for example, a web browser. In some aspects, the one or more data structures reside within the local memory of the client computing device and are not associated with an application. The one or more data structures can be prebuilt into the web browser our updated during an update of the web browser (e.g., an automatic update or a manual update via the user downloading a new version of the web browser).

In some aspects, the first IP address set is provided to the client computing device from a first host associated with the first host name during a prior connection of the client computing device to the first host. The first IP address set can be provided to the client computing device in conjunction with prior content (e.g., text or image(s) in a webpage) provided during the prior connection. For example, the first IP address set can be included in a Hypertext transfer protocol (HTTP) header indicating the first IP address set or via a SPDY message indicating the first IP address set.

In step 240, the client computing device transmits the request for content according to the first DNS resolution via an IP address in the first IP address set, as determined in step 230. The client computing device can receive content (e.g., a webpage) using the first DNS resolution in response to the request for content. After step 240, the process 200 ends.

Figure 3:
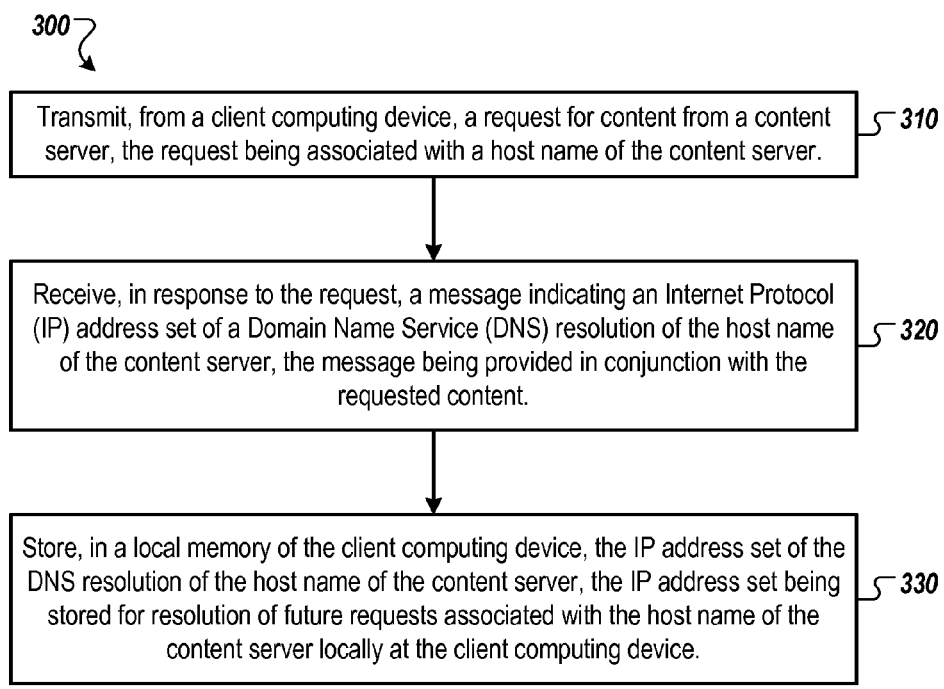
FIG. 3 illustrates an example process by which a domain name service resolution for a content server is received.

FIG. 3 illustrates an example process 300 by which a domain name service resolution for a content server is received.

The process 300 begins at step 310, where a client computing device (e.g., client computing device 102) transmits a request for content (e.g., a webpage) from a content server (e.g., a web server). The request is associated with a host name (e.g., "example.com") of the content server.

In step 320, the client computing device receives, in response to the request, a message indicating an Internet Protocol (IP) address set of a domain name service (DNS) resolution of the host name of the content server. The message is provided in conjunction with the requested content. For example, the message can be provided within an HTTP message. The header of the HTTP message can include the IP address set of the DNS resolution of the host name of the content server. The body of the HTTP message can includes the requested content. The requested content can include text or one or more images of a webpage displayed via a web browser or another application. In some implementations, the message can be provided within a SPDY message.

In step 330, the client computing device stores, in a local memory of the client computing device (e.g. memory 108) the IP address set of the DNS resolution of the host name of the content server. The IP address set is stored for resolution of future requests associated with the host name of the content server locally at the client computing device. The IP address set of the DNS resolution of the host name of the content server can be stored in data structure(s) within a web browser of the client computing device. In some examples, the client computing device verifies that the client computing device has a secure connection with the content server, and stores the IP address set in response to verifying that the client computing device has a secure connection with the content server. In some examples, the client computing device verifies, prior to storing the IP address set of the DNS resolution of the host name of the content server, that a top layer domain (TLD) of a sender of the received message matches the host name of the content server. As such, a malicious server cannot cause an incorrect or suboptimal IP address set of the DNS resolution to be stored on the client computing device. A secure connection can be, for example, a secure socket layer (SSL) connection, a hypertext transfer protocol secure (HTTPS) connection, or a SPDY connection. In some aspects, the client computing device verifies that the content server and the DNS resolution are associated with a common domain (e.g., the example.com domain), and stores the IP address set in response to verifying that the content server and the DNS resolution are associated with the common domain. After step 330, the process 300 ends.

Figure 4:
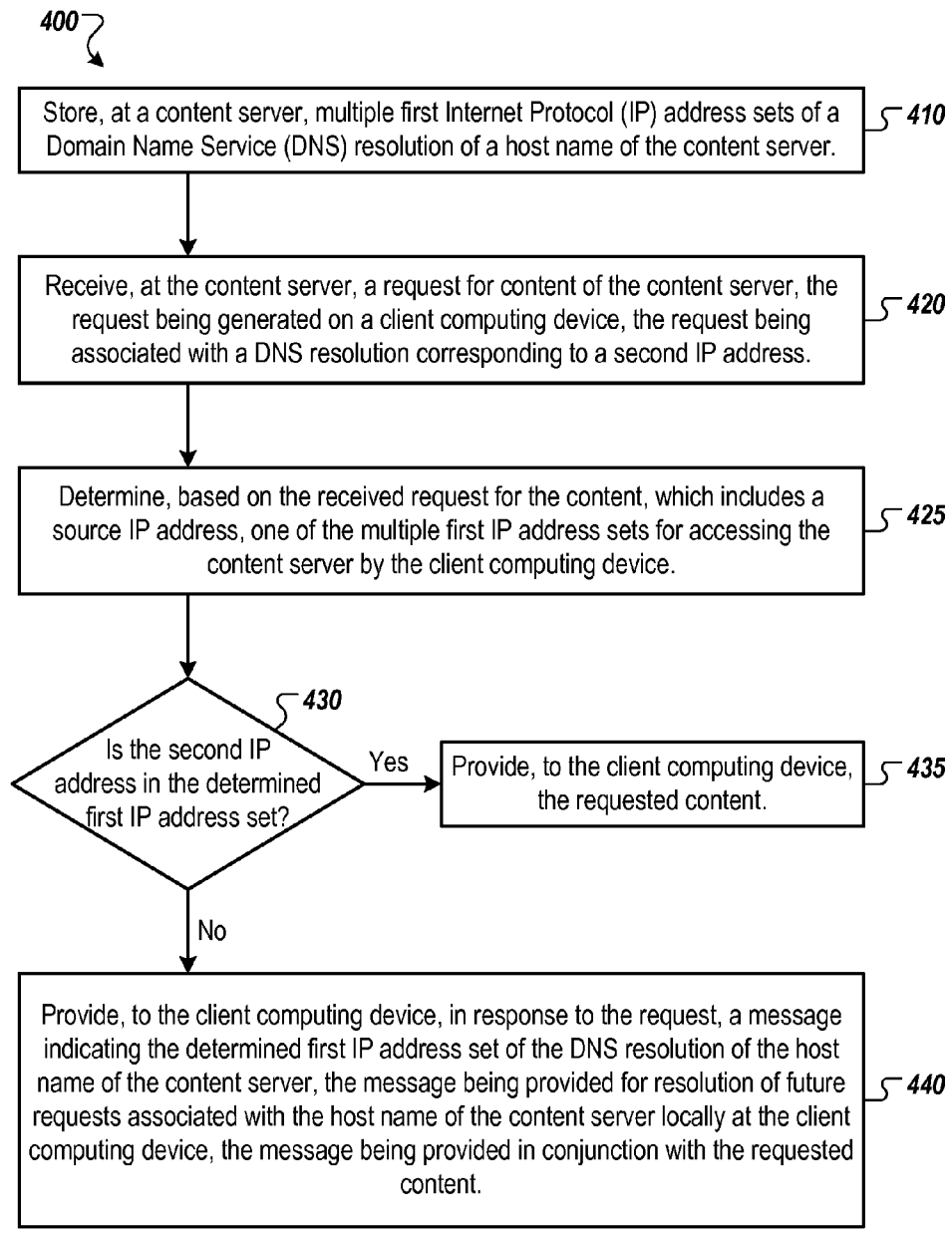
FIG. 4 illustrates an example process by which a request associated with a host name is resolved to an Internet Protocol address at a content server.

FIG. 4 illustrates an example process 400 by which a request associated with a host name is resolved to an Internet Protocol address at a content server.

The process 400 begins at step 410, where a content server (e.g., content server 126) stores, at the content server, multiple first Internet Protocol (IP) address sets of a domain name service (DNS) resolution of a host name of the content server. Each of the multiple first IP address sets may be useful for some client computing device(s) for accessing the content server.

In step 420, the content server receives a request for content (e.g., data of a webpage, text or image(s) displayed in a webpage) of the content server. The request is generated on a client computing device. The request is associated with a DNS resolution corresponding to a second IP address. The second IP address can be an IP address provided by a default DNS lookup server (e.g., a DNS lookup server of an Internet Service Provider (ISP)). The request can be routed from the client computing device to the content server using a DNS resolution by the default DNS lookup server. Alternatively, the second IP address can be an IP address of the content server provided previously by a second content server. In another alternative, the second IP address can be an IP address for the content server stored on the client computing device (e.g., in DNS lookup table 110). In some cases, the IP address for the content server stored on the client computing device can be updated according to steps 425-440 set forth below.

In step 425, the content server determines, based on the received request for the content, which includes a source IP address (of the client computing device), one of the multiple first IP address sets for accessing the content server by the client computing device. The determined first IP address set may include IP addresses that are useful, optimal, or optional for the client computing device to access the content server. The determined first IP address set may be determined based on the source IP address of the client computing device.

In step 430, the content server determines whether the second IP address is in the determined first IP address set. If so, the process 400 continues to step 435. If not, the process 400 continues to step 440.

In step 435, the content server provides, to the client computing device, the requested content. The client computing device may then present the content (e.g., in a web browser window). After step 435, the process 400 ends.

In step 440, the content server provides, to the client computing device, in response to the request, a message indicating the determined first IP address set of the DNS resolution of the host name of the content server. The message is provided for resolution of future requests associated with the host name of the content server locally at the client computing device. The message is provided in conjunction with the requested content. The message can include a hypertext transfer protocol (HTTP) header indicating the first IP address set of the DNS resolution of the host name of the content server, where a body corresponding to the HTTP header includes the requested content. The message can be a SPDY message that includes the first IP address set of the DNS resolution of the host name of the content server.

In some examples, the content server can specify that a specific DNS server and/or a specific DNS resolution should be used in the future for all hosts in the same top level domain (TLD). For example, the content server for www.example.com can specify that the IP address set provided by the server should be used for all domains in the TLD *.example.com, not only for www.example.com. After step 440, the process 400 ends.

Figure 5:
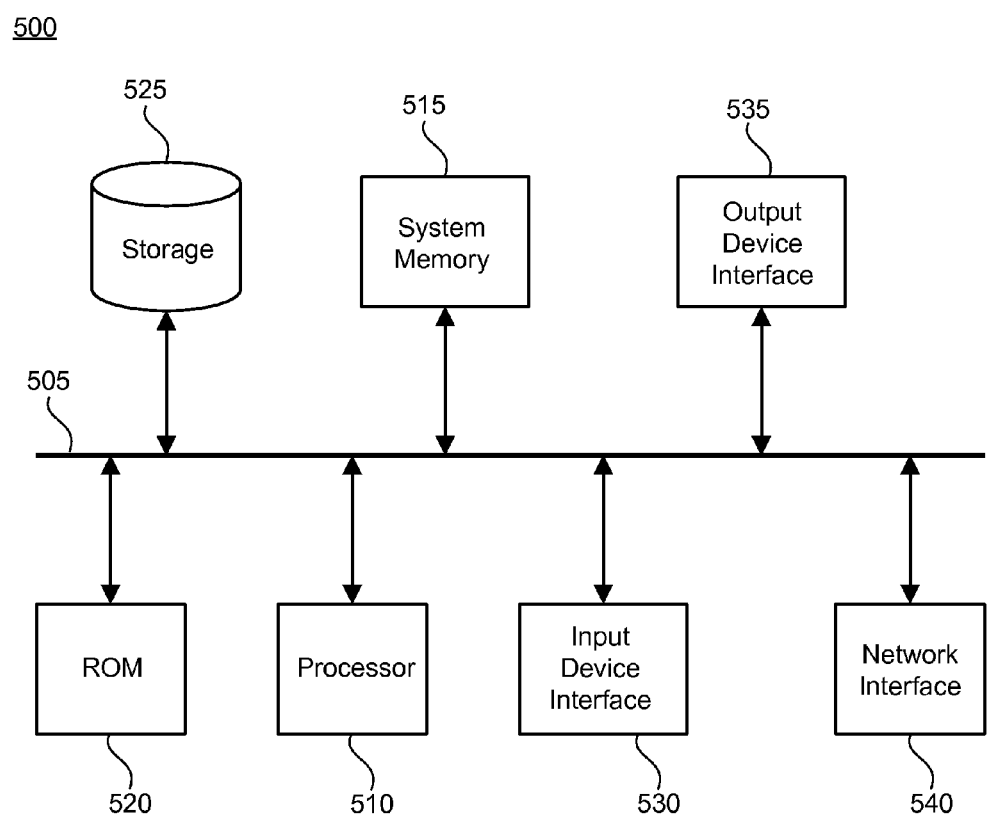
FIG. 5 conceptually illustrates an example electronic system with which some implementations of the subject technology are implemented.

FIG. 5 conceptually illustrates an electronic system 500 with which some implementations of the subject technology are implemented. For example, one or more of the client computing device 102, the default DNS lookup server 122, or the content server 126 may be implemented using the arrangement of the electronic system 500. The electronic system 500 can be a computer (e.g., a mobile phone, PDA), or any other sort of electronic device. Such an electronic system includes various types of computer readable media and interfaces for various other types of computer readable media. Electronic system 500 includes a bus 505, processing unit(s) 510, a system memory 515, a read-only memory 520, a permanent storage device 525, an input device interface 530, an output device interface 535, and a network interface 540.

The bus 505 collectively represents all system, peripheral, and chipset buses that communicatively connect the numerous internal devices of the electronic system 500. For instance, the bus 505 communicatively connects the processing unit(s) 510 with the read-only memory 520, the system memory 515, and the permanent storage device 525.

From these various memory units, the processing unit(s) 510 retrieves instructions to execute and data to process in order to execute the processes of the subject technology. The processing unit(s) can be a single processor or a multi-core processor in different implementations.

The read-only-memory (ROM) 520 stores static data and instructions that are needed by the processing unit(s) 510 and other modules of the electronic system. The permanent storage device 525, on the other hand, is a read-and-write memory device. This device is a non-volatile memory unit that stores instructions and data even when the electronic system 500 is off. Some implementations of the subject technology use a mass-storage device (for example a magnetic or optical disk and its corresponding disk drive) as the permanent storage device 525.

Other implementations use a removable storage device (for example a floppy disk, flash drive, and its corresponding disk drive) as the permanent storage device 525. Like the permanent storage device 525, the system memory 515 is a read-and-write memory device. However, unlike storage device 525, the system memory 515 is a volatile read-and-write memory, such a random access memory. The system memory 515 stores some of the instructions and data that the processor needs at runtime. In some implementations, the processes of the subject technology are stored in the system memory 515, the permanent storage device 525, or the read-only memory 520. For example, the various memory units include instructions for resolving a host name to an IP address in accordance with some implementations. From these various memory units, the processing unit(s) 510 retrieves instructions to execute and data to process in order to execute the processes of some implementations.

The bus 505 also connects to the input and output device interfaces 530 and 535. The input device interface 530 enables the user to communicate information and select commands to the electronic system. Input devices used with input device interface 530 include, for example, alphanumeric keyboards and pointing devices (also called "cursor control devices"). Output device interfaces 535 enables, for example, the display of images generated by the electronic system 500. Output devices used with output device interface 535 include, for example, printers and display devices, for example cathode ray tubes (CRT) or liquid crystal displays (LCD). Some implementations include devices, for example a touchscreen, that functions as both input and output devices.

Finally, as shown in FIG. 5, bus 505 also couples electronic system 500 to a network (not shown) through a network interface 540. In this manner, the electronic system 500 can be a part of a network of computers (for example a local area network ("LAN"), a wide area network ("WAN"), or an Intranet, or a network of networks, for example the Internet. Any or all components of electronic system 500 can be used in conjunction with the subject technology.

The above-described features and applications can be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage or flash storage, for example, a solid-state drive, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, for example is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some aspects of the disclosed subject matter, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components illustrated above should not be understood as requiring such separation, and it should be understood that the described program components and systems can generally be integrated together in a single software product or packaged into multiple software products.

Various modifications to these aspects will be readily apparent, and the generic principles defined herein may be applied to other aspects. Thus, the claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject technology.

A phrase, for example, an "aspect" does not imply that the aspect is essential to the subject technology or that the aspect applies to all configurations of the subject technology. A disclosure relating to an aspect may apply to all configurations, or one or more configurations. A phrase, for example, an aspect may refer to one or more aspects and vice versa. A phrase, for example, a "configuration" does not imply that such configuration is essential to the subject technology or that such configuration applies to all configurations of the subject technology. A disclosure relating to a configuration may apply to all configurations, or one or more configurations. A phrase, for example, a configuration may refer to one or more configurations and vice versa.

What is claimed is:

1. A computer-implemented method for receiving a domain name service (DNS) resolution for a content server, the method comprising:
   transmitting, from a client computing device, a request for content from a content server, the request being associated with a particular Internet Protocol (IP) address based on a default DNS lookup server resolving a host expression of the content server;
   receiving, in response to the request, a message comprising the requested content and an indication of a particular IP address set of a DNS resolution of the host expression of the content server, wherein the requested content comprises text or an image associated with a display for a webpage, and the response to the request was received after the content server determined that the particular IP address was not included in the particular IP address set; and
   storing, in a local memory of the client computing device, the particular IP address set of the DNS resolution of the host expression of the content server, the particular IP address set being stored, locally at the client computing device, for resolution of future requests associated with the host expression of the content server without accessing the default DNS lookup server.

2. The method of claim 1, wherein the host expression of the content server comprises a host name of the content server.

3. The method of claim 2, wherein storing, in the local memory of the client computing device, the particular IP address set of the DNS resolution of the host expression of the content server comprises:
   storing, in one or more data structures within a web browser, the particular IP address set of the DNS resolution of the host expression of the content server.

4. The method of claim 3, wherein the one or more data structures are prebuilt into the web browser.

5. The method of claim 3, one or more data structures are updated during an update of the web browser.

6. The method of claim 1, further comprising:
   verifying, prior to storing the particular IP address set of the DNS resolution of the host expression of the content server, that a top layer domain (TLD) of a sender of the received message matches the host expression of the content server.

7. The method of claim 1, wherein the message comprises a hypertext transfer protocol (HTTP) message, wherein a header of the HTTP message comprises the indication of the particular IP address set of the DNS resolution of the host expression of the content server, and wherein a body of the HTTP message comprises the requested content.

8. The method of claim 1, wherein the message comprises a SPDY message.

9. The method of claim 1, further comprising:
   transmitting, from the client computing device, a subsequent request for respective content from a second content server, the subsequent request being associated with a second Internet Protocol (IP) address based on a second default DNS lookup server resolving a host expression of the second content server; and
   receiving, in response to the subsequent request, a subsequent message comprising the respective content, wherein the second content server determines that the second IP address is included in a third IP address set for accessing the second content server by the client computing device.

10. A non-transitory computer-readable medium for receiving a domain name service (DNS) resolution for a content server, the non-transitory computer-readable medium comprising instructions which, when executed by a computer, cause the computer to perform operations comprising:
    transmitting, from a client computing device, a request for content from a content server, the request being associated with a particular Internet Protocol (IP) address based on a default DNS lookup server resolving a host expression of the content server, the content from the content server comprising text or an image associated with a display for a webpage;
    receiving, in response to the request, a message indicating a particular IP address set of a DNS resolution of the host expression of the content server, the message being provided in conjunction with the requested content, wherein the response to the request was received after the content server determined that the particular IP address was not in the particular IP address set; and
    storing, in a local memory of the client computing device, the particular IP address set of the DNS resolution of the host expression of the content server, the particular IP address set being stored for resolution of future requests associated with the host expression of the content server locally at the client computing device without accessing the default DNS lookup server.

11. The non-transitory computer-readable medium of claim 10, wherein the non-transitory computer-readable medium further comprises instructions, which when executed by the computer, cause the computer to perform further operations comprising:
    verifying that the client computing device has a secure connection with the content server, wherein storing the particular IP address set is in response to verifying that the client computing device has the secure connection with the content server.

12. The non-transitory computer-readable medium of claim 11, wherein the secure connection comprises one of a secure socket layer (SSL) connection, a hypertext transfer protocol secure (HTTPS) connection, or a SPDY connection.

13. The non-transitory computer-readable medium of claim 10, wherein the non-transitory computer-readable medium further comprises instructions, which when executed by the computer, cause the computer to perform further operations comprising:
    verifying that the content server and the DNS resolution are associated with a common domain, wherein storing the particular IP address set is in response to verifying that the content server and the DNS resolution are associated with the common domain.

14. A system for providing for resolving a request associated with a host expression to an Internet Protocol (IP) address, the system comprising:
    one or more device processors; and
    a memory comprising instructions which, when executed by the one or more device processors, cause the one or more device processors to perform operations comprising:
       storing, at a content server, a first IP address set of a domain name service (DNS) resolution of a host expression of the content server;

receiving, at the content server, a request for content of the content server, the request being generated on a client computing device, the request being associated with a DNS resolution from a default DNS lookup server and corresponding to a second IP address, the content of the content server comprising text or an image associated with a display for a webpage;

determining that the second IP address is not in the first IP address set; and providing, to the client computing device, in response to the request and determining that the second IP address is not in the first IP address set, a message indicating the first IP address set of the DNS resolution of the host expression of the content server, the message being provided for resolution of future requests associated with the host expression of the content server locally at the client computing device without accessing the default DNS lookup server, the message being provided in conjunction with the requested content.

15. The system of claim 14, wherein the second IP address comprises an IP address of the default DNS lookup server, and wherein the request is routed from the client computing device to the content server in conjunction with a DNS lookup at the default DNS lookup server.

16. The system of claim 14, wherein the second IP address is not an IP address of the content server, and wherein the second IP address is not an IP address of a DNS resolver.

17. The system of claim 14, wherein the second IP address comprises an IP address for the content server stored on the client computing device.

18. The system of claim 14, wherein the message comprises a hypertext transfer protocol (HTTP) header indicating the first IP address set of the DNS resolution of the host expression of the content server.

19. The system of claim 14, wherein the message comprises a SPDY message, the SPDY message comprising the first IP address set of the DNS resolution of the host expression of the content server.

20. The system of claim 14, wherein the host expression of the content server comprises a host name of the content server.

* * * * *